United States Patent [19]
Archer

[11] Patent Number: 5,485,362
[45] Date of Patent: Jan. 16, 1996

[54] RESONANT POWER CONVERTER FOR CHANGING THE MAGNITUDE OF A DC VOLTAGE

[75] Inventor: Michael P. Archer, Westlake Village, Calif.

[73] Assignee: EOS Corporation, Camarillo, Calif.

[21] Appl. No.: 117,818

[22] Filed: Sep. 8, 1993

[51] Int. Cl.$^6$ ................................................. H02M 3/335
[52] U.S. Cl. ............................... 363/24; 363/95; 363/97; 363/134
[58] Field of Search ................................. 363/15, 16, 20, 363/21, 240, 25, 26, 95, 97, 131, 133, 134

[56] References Cited

U.S. PATENT DOCUMENTS

| | | | |
|---|---|---|---|
| 3,365,657 | 1/1968 | Webb | 363/134 |
| 3,694,726 | 9/1972 | Cielo et al. | 363/25 |
| 4,415,959 | 11/1983 | Vinciarelli | 363/21 |
| 4,774,649 | 9/1988 | Archer | 363/97 |
| 4,796,173 | 1/1989 | Steigerwald | 363/25 |
| 4,823,249 | 4/1989 | Garcia | 363/24 |
| 4,864,478 | 9/1989 | Bloom | 363/16 |
| 4,930,059 | 5/1990 | Rutt | 363/20 |
| 5,073,849 | 12/1991 | Morris | 363/21 |
| 5,177,675 | 1/1993 | Archer | 363/25 |
| 5,208,739 | 5/1993 | Sturgeon | 363/24 |

OTHER PUBLICATIONS

Chryssis, "High–Frequency Switching Power Supplies: Theory And Design", McGraw Hill Book Co, Apr. 1989.

*Primary Examiner*—Jeffrey L. Sterrett
*Attorney, Agent, or Firm*—Seldon & Scillieri

[57] ABSTRACT

The present invention provides a resonant power converter for changing the magnitude of a DC voltage. The converter includes a common magnetic core with three legs (an "EE" core). The core has primary and secondary windings wound onto a first outside leg, and a tank winding and control windings wound onto a second outside leg. Control switch means are provided for effecting alternate pulses of current flow through the primary winding to effectuate alternate flux flow, the control switch means and the primary winding having a predetermined parasitic capacitance with a predetermined delay time between the termination of a given pulse and initiation of the succeeding pulse. The secondary windings are oriented to conduct alternately in phase with the alternate flux flow, there being inherent in the first leg of the transformer a magnetizing inductance, such that the magnetizing current will be great enough to charge said parasitic capacitance in a controlled fashion.

6 Claims, 5 Drawing Sheets

FIG. 3
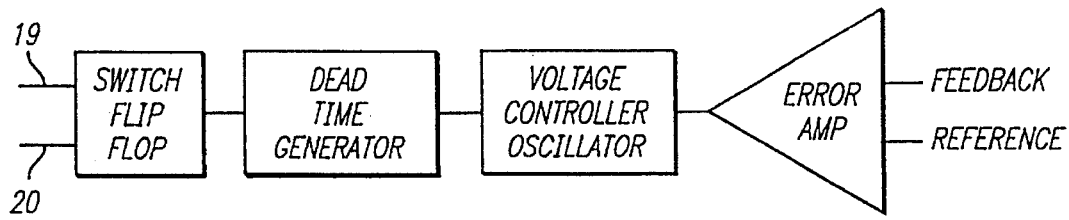
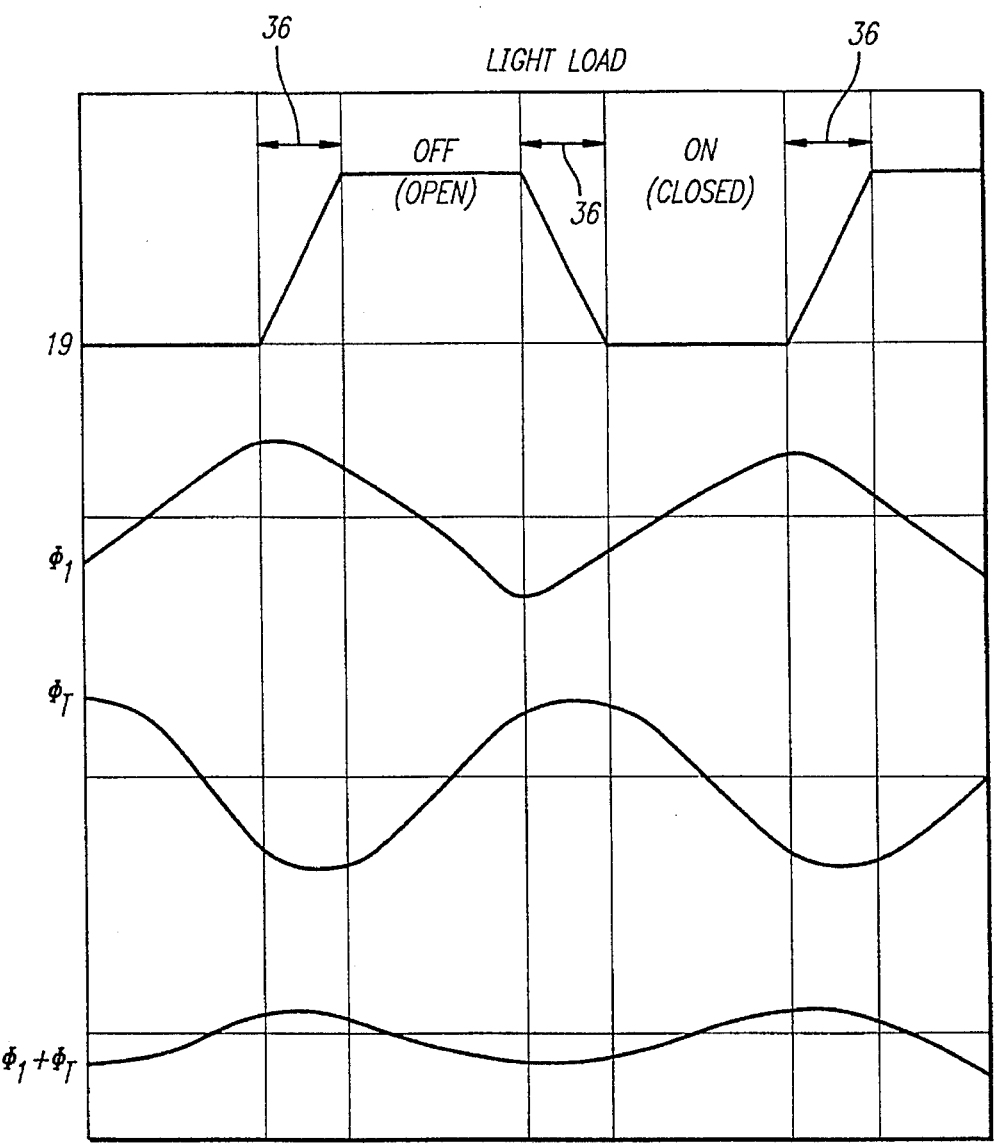
FIG. 4A

RESONANT POWER CONVERTER FOR CHANGING THE MAGNITUDE OF A DC VOLTAGE

FIELD OF INVENTION

This technology relates to DC to DC converters and more specifically to resonant DC to DC converters. This invention is a modification of that disclosed in U.S. Pat. No. 5,177,675 to Archer, the specification and drawings of which are incorporated herein by reference.

BACKGROUND OF THE INVENTION

There are various Converters that change one magnitude DC voltage to another. Conventional converters such as forward and flyback converters are Well described as the prior art Many text's such as George Chryssis "High-Frequency Switching Power Supplies: Theory and Design", McGraw Hill Book Co., can explain the operation of converters such as these.

In the field of zero current, zero voltage resonant converters the common goal for the designer is low material cost, high efficiency and high packing density. Current state of the art converters in this field have raised the packing density from 2 to 4 watts per cubic inch in the last few years. Unfortunately, in the battle over ever-increasing power technologies, the current resonant topologies have stopped moving the densities higher due to a number of nagging problems associated with the implementation of the resonant technologies.

In the prior art converter taught in U.S. Pat. No. 5,177,675 Archer, the topology goals were focused on zero voltage, zero current switching at medium frequencies. The series parallel approach to resonant design was there utilized to achieve a reasonably low cost, off-line, high density switching power supply for use in computer, industrial, and consumer-type products. Packing densities on the order of 4 watts per cubic inch were achieved with this topology in the last couple of years. During the implementation of U.S. Pat. No. 5,177,675, two nagging problems faced the designers in their quest to further reduce the cost, and increase the density to meet customer demands in the 1990's. The operating efficiencies of series-parallel resonant converters, such as the aforementioned patent, which utilize a reduced regulation frequency band, typically 2 to 1 or 4 to 1 for full regulation, have topped out at approximately 85% efficiency for low voltage outputs. Also, since in U.S. Pat. No. 5,177,675 there were two magnetic elements utilized, both of which cross the load line boundary of the power supply, the material and manufacturing costs of the product have limited its ability to replace older cost effective topologies in applications where the size and weight are not of paramount importance.

The major difficulties in increasing the packaging density over their current 4 watts per cubic inch lie in the magnetizing current of the transformer. As discussed in U.S. Pat. No. 5,177,675, magnetizing current is critical to successful zero voltage switching. The ramifications of changing magnetizing current are two-fold.

One major area affected is EMI (electro magnetic interference). In series-parallel converters in which the frequency range has been reduced to its current 2 to 1 or 4 to 1 range, the high voltage dV/dt on the primary switches is limited to a slope change of approximately three to one. The slope of the voltage on the high current switches in high voltage converters is one of the major sources of electromagnetic noise, particularly common mode electromagnetic noise. With the frequency shifts of current technology resonant converters at 2 to 1, and primary slope changes of three to one, the input electromagnetic filtering on the power supplies has been reduced approximately in half over previous conventional converters, or even second generation resonant converts. The goal of the resonant designers is to remove the input EMI filtering completely, however. In an age when the worldwide regulatory agencies continue to increase the EMI requirements for conducted and radiated noise, this task is becoming increasingly difficult. With the current generation of series-parallel resonant converters, under the best case operating condition, where the reset voltage on the primary switches reaches zero just before the control circuit turns on the switch, the EMI performance is excellent. This is due to the fact that the common mode current flowing between the primary and secondary through the transformer, or transformers in the case of U.S. Pat. No. 5,177,675, is low, due to the low dv/dt applied to the transformer primary winding. Under less than ideal conditions, however, the dv/dt can increase, so that the delay to switch turn-on after the voltage has reached zero can be as long as ten percent of the switching frequency. As the slope increases due to frequency shift, the common mode currents increase, causing the input filter size to grow larger than the ideal filter would be, in order to meet conducted EMI levels. Aggravating this phenomenon is the fact that since the zero voltage performance of the series parallel converters is dependent on the total capacitance reflected across the primary windings, it is necessary in practice to compromise the design of the primary switching transformer so that the leakage inductance between primary windings is higher than what the designer would normally like to have in order to achieve a lower primary capacitance. Under the ideal condition of maximum operating frequency, this works out well. However, as the control circuit is forced to reduce the operating frequency in response to changing load and line conditions, this higher leakage inductance causes ringing on the high voltage switches. This type of ringing is much lower than that associated with conventional-type converters, or first and second generation resonant converters, but given the goal of ever smaller input filters, any ringing, other than the fundamental switching frequency and its harmonics, is cause for concern.

The second problem is the decrease in efficiency on the current generation resonant converters as exemplified in U.S. Pat. No. 5,177,675 when the converter is in a condition where the frequency shift is approaching its minimum point (maximum magnetizing current). This is caused by the fact that the RMS current flowing in the switches and primary windings may be as high as 30 percent magnetizing current. This is much better than the first or second generation resonant converters of U.S. Pat. No. 4,415,959 Vincerelli or Japanese patent 1,503,925 Matshushita, but is the limiting factor in efficiency for current generation converters. This phenomenon is caused entirely by frequency shift, since the magnetizing current is a function of the operating frequency of the converter.

OBJECTS OF THE INVENTION

In view of the problems associated in raising the power density above 4 watts per cubic inch in off-line switching power supplies, the object of the present invention is to provide a resonant converter operating with the same principles as the converter of U.S. Pat. No. 5,177,675, but with a greatly reduced frequency shift, allowing the designer to develop off line power supplies with efficiency in the neighborhood of 90%.

Other objects are the removal of the second discrete magnetic element, thus reducing the capacitance between primary and secondary and reducing the material cost of the supply; and the ability for the designer to independently set magnetizing current with little effect on other operating parameters.

These objects are realized herein by employing a common magnetic core structure with three legs (EE core) and two bobbins, each of which resides on an outside leg.

IN THE DRAWINGS

FIG. 1. Shows an implementation of the prior art.

FIG. 2. Shows an embodiment of the converter of the present invention.

FIG. 3. Shows controller implementation.

FIGS. 4–4C. Show operating wave forms for the preferred embodiment.

FIG. 4A shows operation at light load; FIG. 4B, at full load; and

FIG. 4C at medium load.

DETAILED DESCRIPTION

Figure 1:
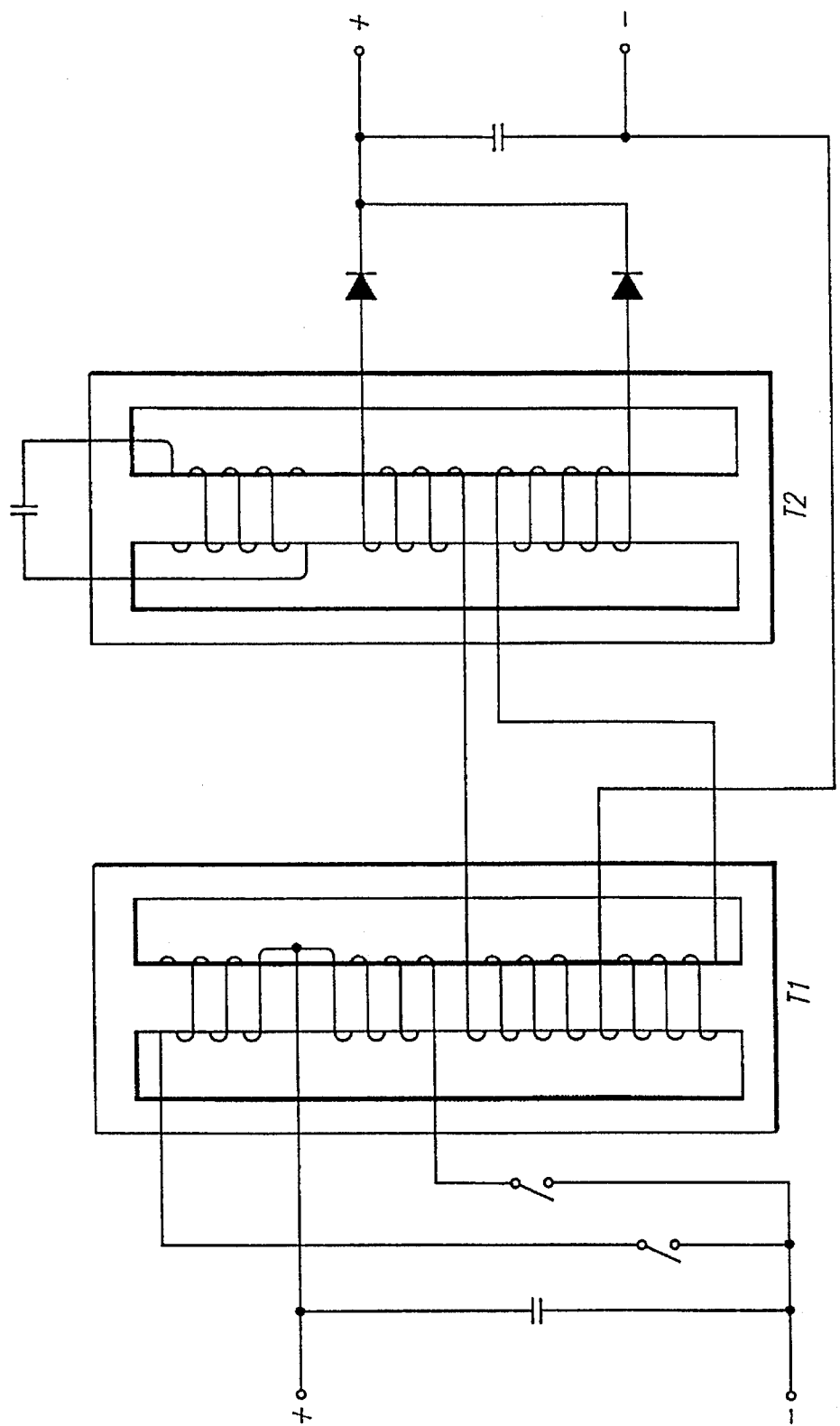
Figure 2:
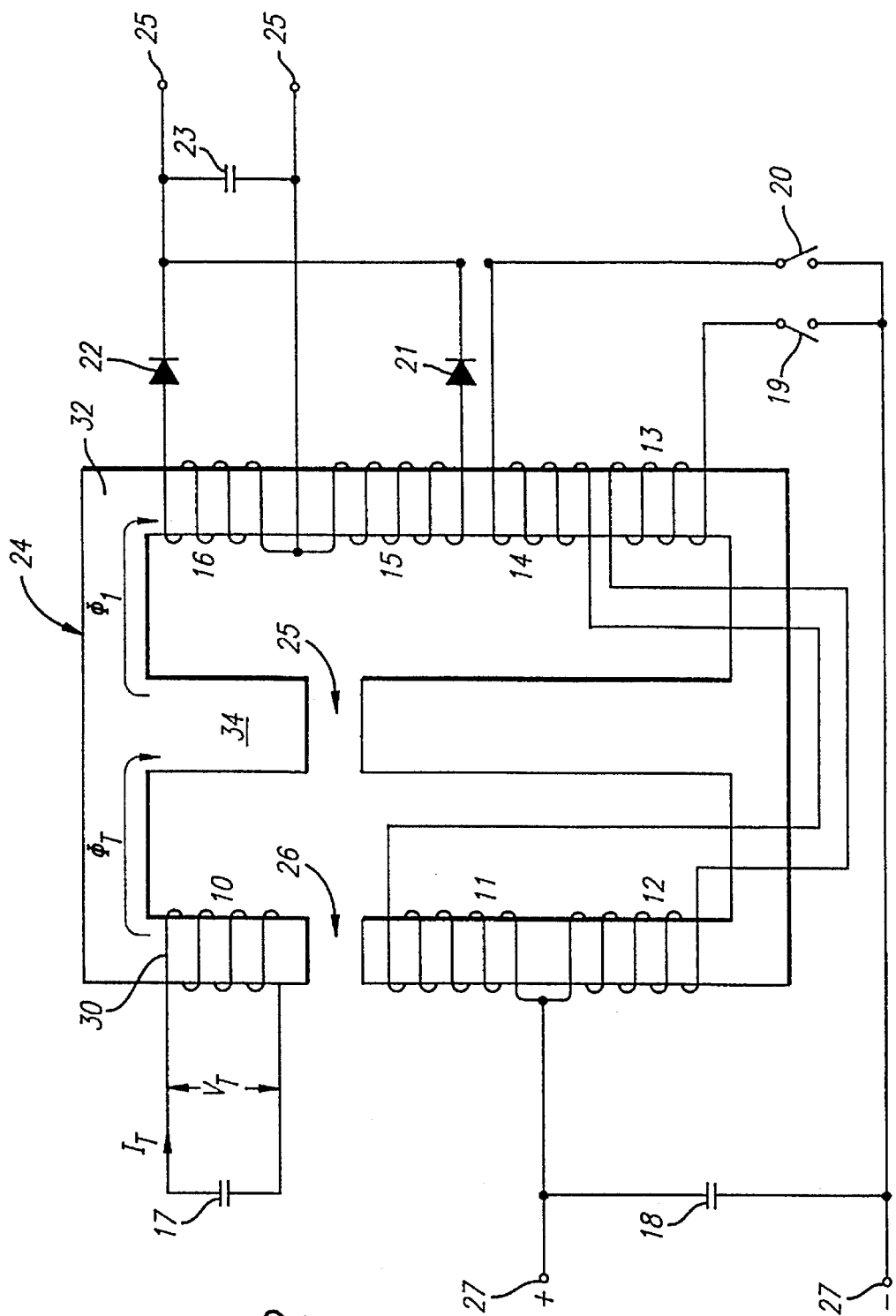

In an embodiment shown in FIG. 2, 24 refers to the core assembly having primary windings 14 and 13 wound with secondary windings 16 and 15 on a first leg 32 and a tank winding 10 and control windings 11 and 12 on a second leg 30. Control windings 11 and 12 are equal in turns but wound opposite in phase to one another, as denoted by the phasing dots. The windings are wound so as to minimize both parasitic capacitance and parasitic leakage inductance. Primary windings 14 and 13 are electrically connected to the control windings 11 and 12, respectively. The primary windings are in series with their respective control windings but are out of phase or in a bucking configuration. Windings 16 and 15 are the secondary, coupled in a conventional configuration with galvanic isolation, to primary windings 14 and 13. Primary switches 19 and 20 are in the primary circuit which supplies the current to excite the transformer assembly.

Power is supplied from a DC source denoted by terminals 27 bridged by capacitor 18 for filtering purposes. Windings 11 and 12 are connected in parallel to the DC source 27. Winding 14 is connected in series with winding 11. Control switch 20 is connected in series with winding 14. Winding 13 is connected in series with winding 12. Switch 19 is connected in series with winding 13. Switches 19 and 20 are operated alternately by the control circuit shown in FIG. 3, with a predetermined delay time between switch 19 and switch 20. Switches 19 and 20 are mosfets having intrinsic diodes which clamp the voltage swing after the opposite switch turns off.

The delay time is effected, inter alia, by designing a predetermined capacitance into the switches 19 and 20 and windings 12 and 13, and 11 and 14. The transformer of FIG. 2 is designed such that the magnetizing current will be great enough to charge the parasitic capacitance of the windings 14, 13, 11, and 12. Control is maintained by introducing a predetermined gap 25 into the third, center leg 34 of the core assembly 24.

Magnetically linked to the control windings 11, 12 by the second leg 30 of core 24 is the tank winding 10. A resonant capacitor 17 is in parallel with winding 10. Magnetically linked to the primary windings 14 and 13 through the first leg 32 of transformer assembly 24 are the secondary windings 16 and 15.

Outputs from the secondary windings 16 and 15 are rectified by any suitable means, exemplified here by diodes 22 and 21, tied to the output terminals 25 and filtered by capacitor 23.

The second or tank leg 30 of the transformer serves two basic functions. First, it controls the current shape flowing between the primary and the secondary via the common flux linkage of the tank leg 30 and the imposed tank flux on the control windings 11 and 12. Since these windings are in series with the main primary windings 14 and 13 on the opposite, first leg 32, all the load current must flow through these control windings 11, 12; and the excited tank winding 10 can impose its shape on the load current. Second, it allows the converter control circuit to control the output voltage by modulating the tank phase with respect to the turn-on times of switches 19, 20. Since the load current must follow the shape of the flux in the tank leg 30, the current amplitude and thus the output voltage are controlled via this modulation process. Gap 26 in leg 30 is used to set the operation frequency of the tank circuit 10, 17.

The operation of FIG. 3 is the same as the operation of FIG. 6 in Archer U.S. Pat. No. 5,177,675. The output at the left in FIG. 3 indicates the signal that operates the respective switch arms 19 and 20 in FIG. 2. As disclosed in Archer U.S. Pat. No. 5,177,564, the control circuit includes an error amplifier (ERROR AMP) that responds to changes in the output load. When the load is increased, the control circuit will decrease the on time of both switches with the off time of both switches being held constant, thereby effectively raising the operating frequency of the converter.

Figure 4B:
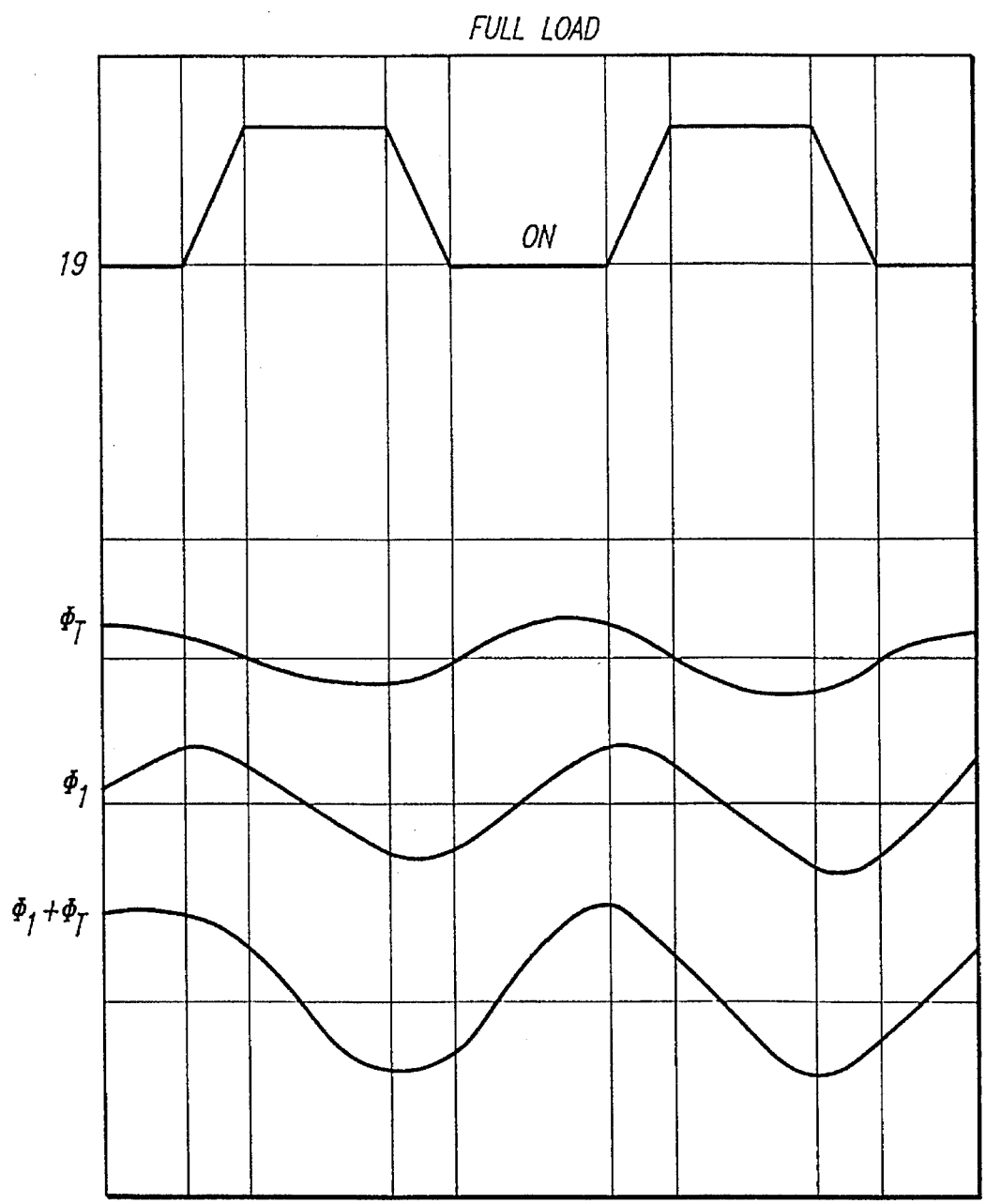
Figure 4C:
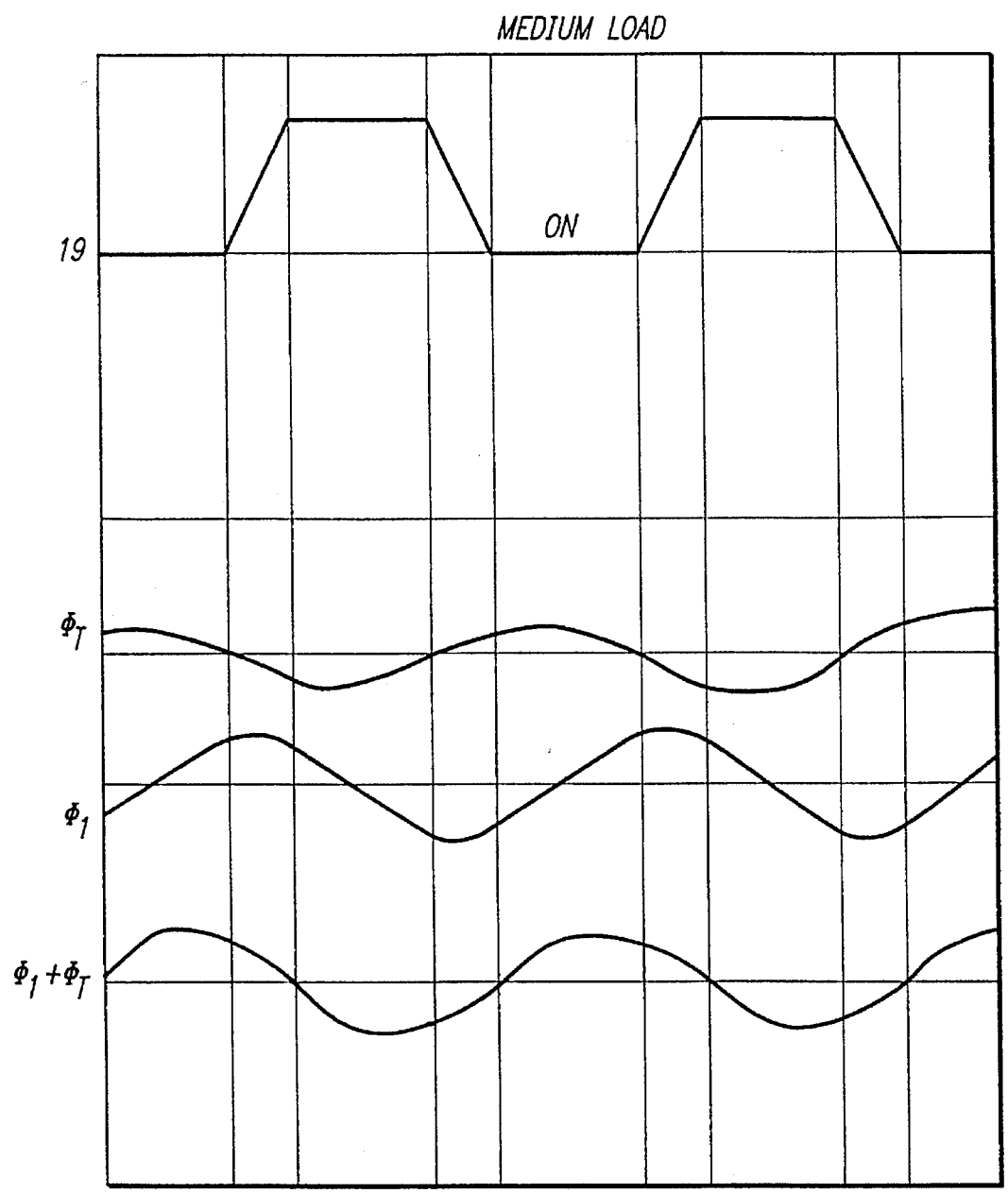

FIG. 4 comprised of FIGS. 4A, 4B, and 4C, shows the converter waveforms at different operation points.

In FIG. 4 eg. FIG. 4A, the wave form 19 represents the condition of the switch 19 in FIG. 2. When line 19 is low, the switch is on or closed: when line 19 is high, the switch is off or open. Switch 20 is the reciprocal of switch 19, being on or closed when switch 19 is off, and vice versa. Interval 36 in FIG. 4A represents dead time, when both switches are off, i.e. open circuited.

$\Phi_1$ is a representation of the flux in the third leg 34. $\Phi_T$ is the flux in the tank or second leg 30. $\Phi_1 + \Phi_T$ is a representation of the flux in the first leg 32 under the influence of the control windings 11, 12.

What is claimed is:

1. A resonant power converter for changing the magnitude of a DC voltage, comprising:

a transformer having a core with at least three legs utilizing three different flux paths, and primary winding means on a first of said legs for effecting alternate flux flow in opposite directions through said core, control switch means for effecting alternate pulses of current flow through said primary winding means to effectuate said alternate flux flow, said control switch means and said primary winding means having a predetermined parasitic capacitance with a predetermined delay time between the termination of a given pulse and initiation of the succeeding pulse, said first leg including a pair of secondary windings oriented to conduct alternately in phase with said alternate flux flow, there being inherent in said first leg of said transformer a magnetizing inductance, such that the magnetizing current will be great enough to charge said parasitic capacitance in a controlled fashion, secondary circuit means including said secondary windings and having rectifying means therein for rectifying the currents in said secondary windings, output circuit means having output terminal means and an output capacitor, tank circuit means comprising transformer means having control winding means on a second of said legs positioned in the converter to be responsive to the load current, means for applying input voltage to said control winding means, a tank winding linked magnetically to said control winding means, and tank capacitor means in parallel with said tank winding.

2. Converter in accordance with claim 1 wherein:

said control switch means includes means responsive to a feedback input to control the initiation and duration of each current pulse.

3. Converter in accordance with claim 1 wherein:

the magnitude of said magnetizing inductance is established by the provision of an air gap in said third leg of said core.

4. Converter in accordance with claim 3 wherein:

said control switch means includes means responsive to a feedback input to control the initiation and duration of each current pulse.

5. Converter in accordance with claim 1 wherein:

said primary winding means comprises a pair of primary windings connected in parallel, said control switch means comprising a pair of control switches in series, respectively, with said primary windings.

6. Converter in accordance with claim 5 wherein:

said control switch means includes means responsive to a feedback input to control the initiation and duration of each current pulse.

* * * * *